United States Patent
Shang et al.

(10) Patent No.: US 9,461,326 B2
(45) Date of Patent: Oct. 4, 2016

(54) METHOD FOR MAKING ANION ELECTROLYTE MEMBRANE

(71) Applicants: Tsinghua University, Beijing (CN); HONG FU JIN PRECISION INDUSTRY (ShenZhen) CO., LTD., Shenzhen (CN)

(72) Inventors: Yu-Ming Shang, Beijing (CN); Yao-Wu Wang, Beijing (CN); Xiao-Feng Xie, Beijing (CN); Min Xu, Beijing (CN); Jin-Hai Wang, Beijing (CN); Shu-Bo Wang, Beijing (CN)

(73) Assignees: Tsinghua University, Beijing (CN); HONG FU JIN PRECISION INDUSTRY (ShenZhen) CO., LTD., Shenzhen (CN)

( * ) Notice: Subject to any disclaimer, the term of this patent is extended or adjusted under 35 U.S.C. 154(b) by 495 days.

(21) Appl. No.: 14/023,669

(22) Filed: Sep. 11, 2013

(65) Prior Publication Data
US 2014/0080015 A1 Mar. 20, 2014

(30) Foreign Application Priority Data

Sep. 19, 2012 (CN) .................... 2012 1 03510219

(51) Int. Cl.
*H01M 8/10* (2016.01)
*H01M 10/0565* (2010.01)
(Continued)

(52) U.S. Cl.
CPC ........ *H01M 8/1081* (2013.01); *C08G 65/4006* (2013.01); *C08G 65/48* (2013.01); *C08J 3/215* (2013.01); *C08J 5/2256* (2013.01); *C08K 3/22* (2013.01); *C08K 3/36* (2013.01); *C08K 5/14* (2013.01); *C08K 5/315* (2013.01); *C08L 71/00* (2013.01); *H01M 8/1027* (2013.01); *H01M 8/1039* (2013.01); *H01M 8/1051* (2013.01);
(Continued)

(58) Field of Classification Search
CPC combination set(s) only.
See application file for complete search history.

(56) References Cited

U.S. PATENT DOCUMENTS 5,235,044 A * 8/1993 Mercer ............. C07D 271/107
534/550
6,201,051 B1 * 3/2001 Mager .................... C08G 61/12
524/183

(Continued)

FOREIGN PATENT DOCUMENTS

WO WO 2011/038198 * 3/2011 ............. B01J 49/00

OTHER PUBLICATIONS

Yang et al., "The influence of nano-sized TiO2 fillers on the morphologies and properties of PSF UF membrane" J. Membrane Science 288 (2007) 231-238 (available online Nov. 23, 2006).*

(Continued)

*Primary Examiner* — Ula C Ruddock
*Assistant Examiner* — Amanda Barrow
(74) *Attorney, Agent, or Firm* — Zhigang Ma

(57) ABSTRACT

In a method for making an anion electrolyte membrane, an inorganic nano-powder is uniformly dispersed in an organic solvent to form a mixture. A fluorinated poly(aryl ether) ionomer is dissolved in the mixture to form a first solution. An active component is further dissolved in the first solution to form a second solution. A crosslinking catalyst is added to the second solution to form a membrane casting solution. The membrane casting solution is coated on a substrate to form a membrane, and the coated substrate is heated. Then, the membrane is peeled from the substrate.

15 Claims, 1 Drawing Sheet

(51) Int. Cl.

| | |
|---|---|
| C08K 3/22 | (2006.01) |
| C08K 3/36 | (2006.01) |
| C08J 3/215 | (2006.01) |
| C08J 5/22 | (2006.01) |
| C08K 5/14 | (2006.01) |
| C08K 5/315 | (2006.01) |
| C08G 65/40 | (2006.01) |
| C08G 65/48 | (2006.01) |
| C08L 71/00 | (2006.01) |
| H01M 8/18 | (2006.01) |

(52) U.S. Cl.
CPC ..... *H01M 10/0565* (2013.01); *C08J 2371/08* (2013.01); *C08K 2201/011* (2013.01); *H01M8/188* (2013.01); *H01M 2008/1095* (2013.01); *Y02E 60/523* (2013.01); *Y02P 70/56* (2015.11)

(56) References Cited

U.S. PATENT DOCUMENTS

| | | | | |
|---|---|---|---|---|
| 2002/0094466 | A1* | 7/2002 | Kerres | B01D 67/0041 429/493 |
| 2004/0005474 | A1* | 1/2004 | Charnock | B01D 67/0009 428/515 |
| 2006/0194096 | A1* | 8/2006 | Valle | B01D 67/0079 429/482 |
| 2008/0039554 | A1* | 2/2008 | Liu | B01D 67/0079 523/310 |
| 2008/0134883 | A1* | 6/2008 | Kumar | B01D 53/228 95/45 |
| 2008/0226960 | A1* | 9/2008 | Fukuta | H01M 8/1002 429/423 |
| 2009/0233146 | A1* | 9/2009 | Lee | C08G 65/4006 429/493 |
| 2010/0197859 | A1* | 8/2010 | Weber | B01D 67/0011 525/54.3 |
| 2011/0045349 | A1* | 2/2011 | Pushparaj | H01G 9/0029 429/212 |
| 2012/0107725 | A1* | 5/2012 | Akashi | C08J 5/2275 429/493 |
| 2012/0219798 | A1* | 8/2012 | Aoki | C01B 31/36 428/402 |
| 2014/0030613 | A1* | 1/2014 | Shang | H01M 8/1039 429/408 |

OTHER PUBLICATIONS

Hu et al., "Preparation and characterization of fluorinated poly(aryl ether oxadiazole)s anion exchange membranes based on imidazolium salts," Intl. J. Hydrogen Energy 37 (2012) 12659-12665.*

Li et al, "A cross-linked fluorinated poly(aryl ether oxadiazole)s using a thermal cross-linking for anion exchange membranes," Intl. J. Hydrogen Energy 38 (2013) 11038-11044.*

Zhou et al., "Crosslinked, epoxy-based anion conductive membranes for alkaline membrane fuel cells," J. Membrane Science 350 (2010) 286-292.*

Gomes et al, "Fluorinated polyoxadiazole for high-temperature polymer electrolyte membrane fuel cell," J. of Membrane Sciences 321 (2008) 114-122.*

Shang et al, "Fluorene-containing sulfonated poly(arylene ether 1,3,4-oxadiazole) as proton-exchange membrane for PEM fuel cell applications," J. of Membrane Science 291 (2007) 140-147.*

* cited by examiner

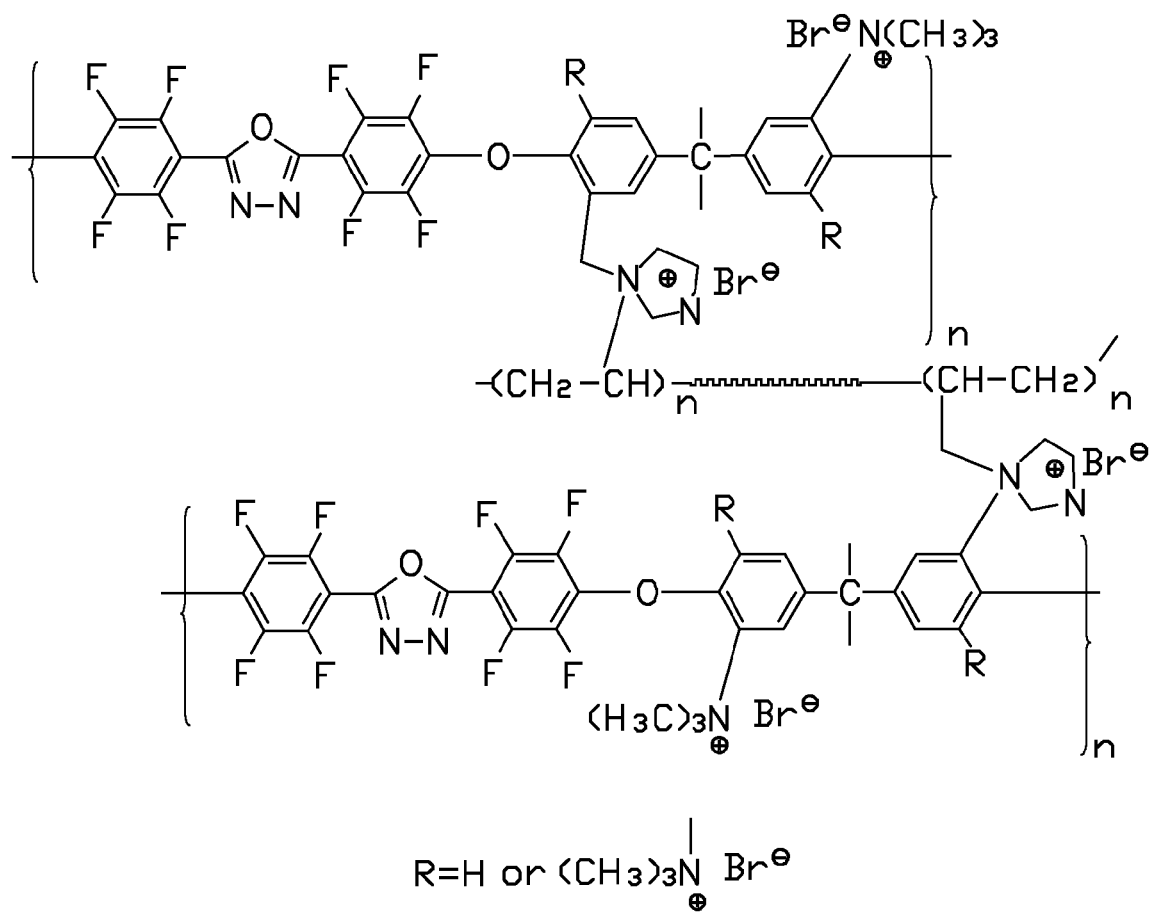

METHOD FOR MAKING ANION ELECTROLYTE MEMBRANE

RELATED APPLICATIONS

This application claims all benefits accruing under 35 U.S.C. §119 from China Patent Application No. 201210351021.9, filed on Sep. 19, 2012 in the China Intellectual Property Office, the disclosure of which is incorporated herein by reference. This application is related to a commonly-assigned application entitled, "METHOD FOR MAKING ANION ELECTROLYTE MEMBRANE", filed 2013 Jul. 24, Ser. No. 13/949,392.

BACKGROUND

1. Technical Field

The present disclosure relates to a method for making an anion electrolyte membrane.

2. Discussion of Related Art

Ion exchange membranes are key components for direct methanol fuel cells (DMFC), polymer electrolyte membrane fuel cells (PEMFC), and vanadium redox batteries (VRB). The ion exchange membrane is a membrane having ion groups, and is selectively permeable to specific ions, and the membrane separates a cathode electrode from an anode electrode while allowing transfer of ions between the cathode electrode and the anode electrode.

The most widely used ion exchange membranes are perfluorinated sulfonic acid membranes, such as Nafion® films, which are cation exchange membranes. The Nafion® films have high conductivity for ions, high chemical stability, and good mechanical strength. However, the cost of the Nafion® films is relatively high. Further, the Nafion® films are acidic, which cause an erosion of the platinum electrodes, a slow kinetics of electrode reaction, and high fuel permeability in PEMFCs. In VRBs, the sulfonic groups of the perfluorinated sulfonic acid membranes allow protons to transfer therethrough. However, vanadium ions can also transfer through the membranes, which contaminate the electrolytes and cause self-discharge of the batteries.

To solve the above described problems, an anion exchange membrane is proposed to substitute the perfluorinated sulfonic acid membrane. The anion exchange membrane is alkaline. In PEMFCs, $OH^-$ is used as a charge carrier to move from the cathode electrode to the anode electrode, which effectively decreases fuel permeability. Further, by using the anion exchange membrane, a cheaper catalyst such as silver or nickel can be used to replace the platinum, thereby decreasing the cost of the PEMFC. The anion exchange membrane is less erosive than the cation exchange membranes, so that a wider range of materials can be selected for the electrode plate, current collector, and sealing material. In VRBs, due to the Donan effect, the permeation of vanadium ions through the anion exchange membrane is effectively reduced, so that the efficiency of the VRB is increased.

What is needed, therefore, is to provide a method for making an anion electrolyte membrane.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

The FIGURE shows a schematic view of a chemical structure of one embodiment of an anion electrolyte membrane.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

A method for making an anion electrolyte membrane is provided. The anion electrolyte membrane is a fluorinated poly(aryl ether) anion electrolyte membrane. The method includes steps of:

S1, uniformly dispersing inorganic nano-powder in an organic solvent to form a mixture;

S2, dissolving a fluorinated poly(aryl ether) ionomer in the mixture to form a first solution having the inorganic nano-powder dispersed therein and the fluorinated poly(aryl ether) ionomer dissolved therein;

S3, further dissolving an active component to the first solution to form a second solution having the inorganic nano-powder dispersed therein and the fluorinated poly(aryl ether) ionomer and the active component dissolved therein;

S4, adding a crosslinking catalyst to the second solution to form a membrane casting solution;

S5, coating the membrane casting solution on a substrate to form a membrane, and heating the membrane in a first temperature range of about 60° C. to about 80° C. for about 10 hours to about 24 hours, following by heating the membrane in a second temperature range of about 100° C. to about 200° C. for about 6 hours to about 24 hours; and S6, peeling the membrane from the substrate.

Step S1 can be carried out in a protective gas. The protective gas can be an inert gas (e.g., argon gas) or nitrogen gas. Step S1 can further include a step of stirring and/or ultrasonic vibrating the mixture of the inorganic nano-powder and the organic solvent at a temperature ranged from about 0° C. to about 30° C. for about 0.5 hours to about 2 hours to uniformly disperse the inorganic nano-powder in the organic solvent. The inorganic nano-powder is at least one of nano-sized silicon dioxide ($SiO_2$) powder, nano-sized titanium dioxide ($TiO_2$) powder, and nano-sized zirconium dioxide ($ZrO_2$) powder. The organic solvent can be at least one of dimethylformamide, dimethylacetamide, 1,2-dichloroethane, acetonitrile, dimethyl sulfoxide, diphenylsulfone, sulfolane, and N-methylpyrrolidinone (NMP).

Step S2 can be carried out in the protective gas. A mass ratio of the inorganic nano-powder to the fluorinated poly (aryl ether) ionomer can be in a range from about 1:100 to about 25:100. A mass ratio of the fluorinated poly(aryl ether) ionomer to the organic solvent can be about 5:100 to about 20:100. Step S2 can further include stirring the first solution until the fluorinated poly(aryl ether) ionomer is completely and uniformly dissolved in the organic solvent. The fluorinated poly(aryl ether) ionomer has a chemical structure represented by a formula (a):

(a)

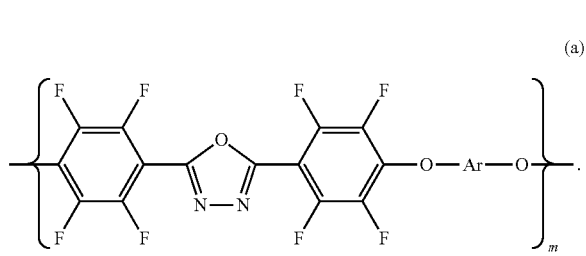

In the formula (a), Ar is a chemical group named TMPA or TMBA, represented by the following formulas:

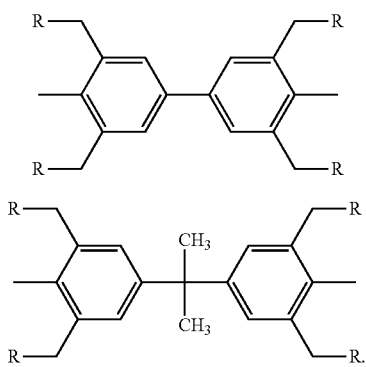

R is independently selected from hydrogen (H) and Rf. Rf can be independently selected from functional groups (I), (II), (III), (IV), and (V):

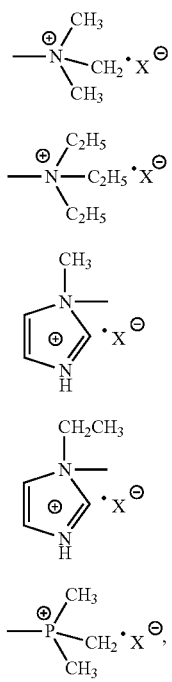

wherein X is at least one of $F^-$, $Cl^-$, $Br^-$, $I^-$, and $OH^-$.

At least one R in the fluorinated poly(aryl ether) ionomer can be the functional group (I), (II), (III), (IV), or (V). The proportion of the mole amount of the Rf to the total mole amount of R in the fluorinated poly(aryl ether) ionomer is the functional degree (i.e., functional degree=mole amount of Rf/(mole amount of H+mole amount of Rf)). The functional degree of the fluorinated poly(aryl ether) ionomer can be about 15% to about 95%. The number average molecular weight of the fluorinated poly(aryl ether) ionomer can be about 5000 to about 200000.

A mass ratio of the active component to the fluorinated poly(aryl ether) ionomer can be in a range from about 1:100 to about 40:100. Step S3 can further include stirring the second solution until the active component is uniformly dissolved in the organic solvent. The active component can be at least one of 1-vinylimidazole and 1-allylimidazole. In one embodiment, the fluorinated poly(aryl ether) ionomer is formed from a copolymerization between an Ar monomer and 2,5-bis(2,3,4,5,6-pentafluorophenyl)-1,3,4-oxadiazole.

Step S4 can be carried out when a temperature of the second solution is about 0° C. to about 30° C. A mass ratio of the crosslinking catalyst to the active component can be in a range from about 0.1:100 to about 10:100. Step S4 can further include stirring the membrane casting solution until the crosslinking catalyst is uniformly mixed with the second solution. The crosslinking catalyst can be at least one of benzoyl peroxide, cyclohexanone peroxide, 2,2'-azobis(2-methylpropionitrile), and 2,2'-azobis-(2,4-dimethylvaleronitrile).

Before step S5, a crosslinking reaction has not occurred in the membrane casting solution. The two heating temperature ranges remove the solvent and catalyze the crosslinking reaction in the membrane. Thus, after the two stages of heating, an interpenetrating polymer network in the membrane is achieved.

In step S6, the membrane can be peeled from the substrate and washed with deionized water to remove impurities in the membrane.

In the method for making the anion electrolyte membrane, the raw materials are cheap and easy to acquire, and can be easily and uniformly mixed together. The anion electrolyte membrane has a relatively good stability, strong mechanical strength, high anion conductivity, and low $VO^{2+}$ permeability. The anion electrolyte membrane can be used in VRBs, DMFCs, PEMFCs, ion-exchange resins, membrane separation technologies.

A chemical structure of one embodiment of the anion electrolyte membrane is shown in FIG. 1.

More specific embodiments are described below.

Example 1

Under an $N_2$ atmosphere, 1 g of nano-sized $SiO_2$ powder is added to 2000 mL of dimethylformamide to form a mixture. The mixture is ultrasonicated and stirred at 0° C. for about 0.5 hours.

Then, 100 g of fluorinated poly(aryl ether) ionomer is dissolved in the mixture by stirring to form the first solution. In the fluorinated poly(aryl ether) ionomer, Ar is TMPA, R is the functional group (II), X is $Cl^-$, and the functional degree is about 15%. The number average molecular weight of the fluorinated poly(aryl ether) ionomer is about 5000.

After that, the first solution is stirred while 1 g of 1-vinylimidazole is added to the first solution to form the second solution.

Then, 0.1 g of benzoyl peroxide is added to the second solution at about 0° C., and uniformly mixed to form the membrane casting solution. The membrane casting solution is coated on the substrate and left to stand for about 24 hours at about 60° C., then left to stand for about 6 hours at about 150° C. Then, the membrane is peeled from the substrate and washed with deionized water, to achieve the fluorinated poly(aryl ether) anion electrolyte membrane.

Example 2

Under an Ar atmosphere, 50 g of nano-sized $ZrO_2$ powder is added to 1000 mL of dimethylacetamide to form a mixture. The mixture is ultrasonicated and stirred at 0° C. for about 2 hours.

Then, 200 g of fluorinated poly(aryl ether) ionomer is dissolved in the mixture by stirring to form the first solution. In the fluorinated poly(aryl ether) ionomer, Ar is TMBA, R is the functional group (I), X is $Br^-$, and the functional degree is about 95%. The number average molecular weight of the fluorinated poly(aryl ether) ionomer is about 200000.

After that, the first solution is stirred while 80 g of 1-allylimidazole is added to the first solution to form the second solution.

Then, 0.08 g of cyclohexanone peroxide is added to the second solution at about 30° C., and uniformly mixed to form the membrane casting solution. The membrane casting solution is coated on the substrate and left to stand for about 10 hours at about 80° C., then left to stand for about 4 hours at about 150° C. Then, the membrane is peeled from the substrate and washed with deionized water, to achieve the fluorinated poly(aryl ether) anion electrolyte membrane.

Example 3

Under an Ar atmosphere, 10 g of nano-sized $TiO_2$ powder is added to 1000 mL of dimethyl sulfoxide to form a mixture. The mixture is ultrasonicated and stirred at 10° C. for about 1.5 hours.

Then, 100 g of fluorinated poly(aryl ether) ionomer is dissolved in the mixture by stirring to form the first solution. In the fluorinated poly(aryl ether) ionomer, Ar is TMBA, R is the functional group (IV), X is $OH^-$, and the functional degree is about 50%. The number average molecular weight of the fluorinated poly(aryl ether) ionomer is about 100000.

After that, the first solution is stirred while 20 g of 1-vinylimidazole is added to the first solution to form the second solution.

Then, 0.2 g of 2,2'-azobis-(2,4-dimethylvaleronitrile) is added to the second solution at about 10° C., and uniformly mixed to form the membrane casting solution. The membrane casting solution is coated on the substrate and left to stand for about 15 hours at about 70° C., then left to stand for about 20 hours at about 120° C. Then, the membrane is peeled from the substrate and washed with deionized water, to achieve the fluorinated poly(aryl ether) anion electrolyte membrane.

Example 4

Under an $N_2$ atmosphere, 30 g of nano-sized $SiO_2$ powder is added to 2000 mL of N-methylpyrrolidinone to form a mixture. The mixture is ultrasonicated and stirred at 15° C. for about 1 hours.

Then, 150 g of fluorinated poly(aryl ether) ionomer is dissolved in the mixture by stirring to form the first solution. In the fluorinated poly(aryl ether) ionomer, Ar is TMPA, R is the functional group (III), X is $I^-$, and the functional degree is about 80%. The number average molecular weight of the fluorinated poly(aryl ether) ionomer is about 150000.

After that, the first solution is stirred while 45 g of 1-allylimidazole is added to the first solution to form the second solution.

Then, 0.9 g of 2,2'-azobis(2-methylpropionitrile) is added to the second solution at about 25° C., and uniformly mixed to form the membrane casting solution. The membrane casting solution is coated on the substrate and left to stand for about 16 hours at about 80° C., then left to stand for about 18 hours at about 200° C. Then, the membrane is peeled from the substrate and washed with deionized water, to achieve the fluorinated poly(aryl ether) anion electrolyte membrane.

Example 5

Under an $N_2$ atmosphere, 50 g of nano-sized $ZrO_2$ powder is added to 4000 mL of 1,2-dichloroethane to form a mixture. The mixture is ultrasonicated and stirred at 0° C. for about 1 hours.

Then, 300 g of fluorinated poly(aryl ether) ionomer is dissolved in the mixture by stirring to form the first solution. In the fluorinated poly(aryl ether) ionomer, Ar is TMBA, R is the functional group (V), X is F, and the functional degree is about 88%. The number average molecular weight of the fluorinated poly(aryl ether) ionomer is about 50000.

After that, the first solution is stirred while 80 g of 1-vinylimidazole is added to the first solution to form the second solution.

Then, 2 g of benzoyl peroxide is added to the second solution at about 30° C., and uniformly mixed to form the membrane casting solution. The membrane casting solution is coated on the substrate and left to stand for about 18 hours at about 60° C., then left to stand for about 16 hours at about 180° C. Then, the membrane is peeled from the substrate and washed with deionized water, to achieve the fluorinated poly(aryl ether) anion electrolyte membrane.

Example 6

Under an $N_2$ atmosphere, 80 g of nano-sized $SiO_2$ powder is added to 3000 mL of 1,2-dichloroethane to form a mixture. The mixture is ultrasonicated and stirred at 0° C. for about 2 hours.

Then, 400 g of fluorinated poly(aryl ether) ionomer is dissolved in the mixture by stirring to form the first solution. In the fluorinated poly(aryl ether) ionomer, Ar is TMPA, R is the functional group (III), X is $Br^-$, and the functional degree is about 45%. The number average molecular weight of the fluorinated poly(aryl ether) ionomer is about 150000.

After that, the first solution is stirred while 40 g of 1-allylimidazole is added to the first solution to form the second solution.

Then, 0.08 g of 2,2'-azobis-(2,4-dimethylvaleronitrile) is added to the second solution at about 30° C., and uniformly mixed to form the membrane casting solution. The membrane casting solution is coated on the substrate and left to stand for about 20 hours at about 60° C., then left to stand for about 20 hours at about 180° C. Then, the membrane is peeled from the substrate and washed with deionized water, to achieve the fluorinated poly(aryl ether) anion electrolyte membrane.

The fluorinated poly(aryl ether) anion electrolyte membrane made in Examples 1 to 6 were tested, and the test results are shown in Table 1. The tests were carried out at about 30° C.

TABLE 1

|  | Water uptake (wt %) | Swelling ratio (%) | Methanol permeability (cm$^2 \cdot$ s$^{-1}$) | Ion conductivity (S $\cdot$ cm$^{-1}$) | VO$^{2+}$ permeability (cm$^2$/min) |
|---|---|---|---|---|---|
| Example 1 | 16 | <1 | 1.2 × 10$^{-8}$ | 1.5 × 10$^{-2}$ | 1.7 × 10$^{-8}$ |
| Example 2 | 21 | <1 | 1.6 × 10$^{-7}$ | 3.9 × 10$^{-2}$ | 7.6 × 10$^{-8}$ |
| Example 3 | 18 | <1 | 4.5 × 10$^{-8}$ | 3.6 × 10$^{-2}$ | 4.6 × 10$^{-8}$ |
| Example 4 | 26 | <1 | 2.2 × 10$^{-8}$ | 3.8 × 10$^{-2}$ | 4.5 × 10$^{-8}$ |
| Example 5 | 28 | <1 | 3.6 × 10$^{-8}$ | 4.5 × 10$^{-2}$ | 1.3 × 10$^{-7}$ |
| Example 6 | 22 | <1 | 1.7 × 10$^{-7}$ | 5.6 × 10$^{-2}$ | 3.7 × 10$^{-8}$ |

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making an anion electrolyte membrane, comprising:
   uniformly dispersing inorganic nano-powder in an organic solvent to form a mixture;
   dissolving a fluorinated poly(aryl ether) ionomer in the mixture to form a first solution having the inorganic nano-powder dispersed therein and the fluorinated poly(aryl ether) ionomer dissolved therein;
   wherein the fluorinated poly(aryl ether) ionomer has a chemical structure represented by a formula of

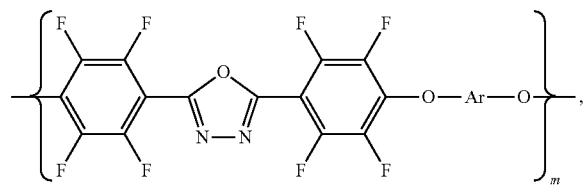

wherein Ar is a chemical group of

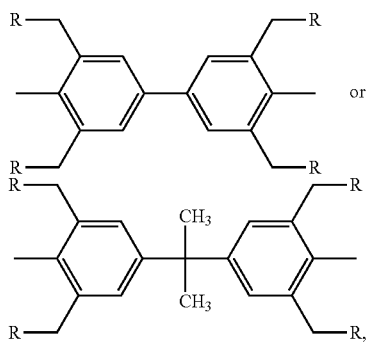

wherein R is independently selected from the group consisting of hydrogen, functional groups (I), (II), (III), (IV), and (V):

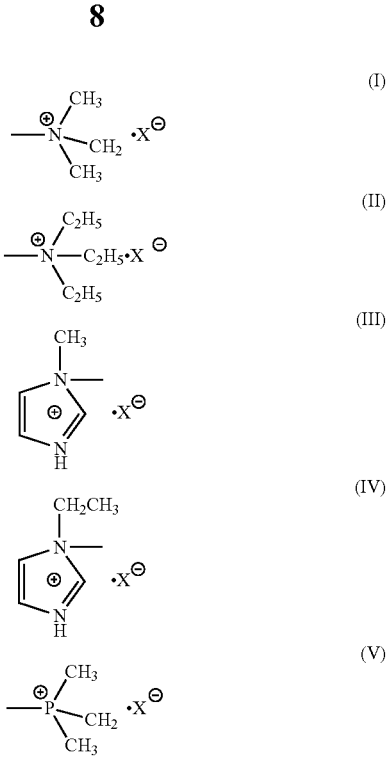

wherein X is at least one of F$^-$, Cl$^-$, Br$^-$, I$^-$, and OH$^-$;
   further dissolving an active component within the first solution to form a second solution having the inorganic nano-powder dispersed therein and the fluorinated poly(aryl ether) ionomer and the active component dissolved therein;
   adding a crosslinking catalyst to the second solution to form a membrane casting solution at a temperature of about 0° C. to about 30° C.;
   coating the membrane casting solution on a substrate to form a membrane, and heating the membrane in a first temperature range of about 60° C. to about 80° C. for about 10 hours to about 24 hours, following by heating the membrane in a second temperature range of about 100° C. to about 200° C. for about 6 hours to about 24 hours; and
   peeling the membrane from the substrate.

2. The method of claim 1, wherein the uniformly dispersing inorganic nano-powder in the organic solvent is processed in a protective gas, and the protective gas is nitrogen gas or argon gas.

3. The method of claim 1, wherein the inorganic nano-powder is selected from the group consisting of nano-sized silicon dioxide powder, nano-sized titanium dioxide powder, nano-sized zirconium dioxide powder, and combinations thereof.

4. The method of claim 1, wherein a functional degree of the fluorinated poly(aryl ether) ionomer is about 15%~95%.

5. The method of claim 1, wherein a number average molecular weight of the fluorinated poly(aryl ether) ionomer is about 5000 to about 200000.

6. The method of claim 1, wherein the organic solvent is selected from the group consisting of dimethylformamide, dimethylacetamide, 1,2-dichloroethane, acetonitrile, dimethyl sulfoxide, diphenylsulfone, sulfolane, and N-methyl-pyrrolidinone.

7. The method of claim 1, wherein the uniformly dispersing inorganic nano-powder in the organic solvent comprises a step of stirring the mixture at a temperature ranged from about 0° C. to about 30° C. for about 0.5 hours to about 2 hours.

8. The method of claim 1, wherein the uniformly dispersing inorganic nano-powder in the organic solvent comprises a step of ultrasonic vibrating the mixture at a temperature ranged from about 0° C. to about 30° C. for about 0.5 hours to about 2 hours.

9. The method of claim 1, wherein a mass ratio of the inorganic nano-powder to the fluorinated poly(aryl ether) ionomer is in a range from about 1:100 to about 25:100.

10. The method of claim 1, wherein a mass ratio of the fluorinated poly(aryl ether) ionomer to the organic solvent is about 5:100 to about 20:100.

11. The method of claim 1, wherein the active component is selected from the group consisting of 1-vinylimidazole, 1-allylimidazole, and a combination thereof.

12. The method of claim 1, wherein the crosslinking catalyst is selected from the group consisting of benzoyl peroxide, cyclohexanone peroxide, 2,2'-azobis(2-methylpropionitrile), 2,2'-azobis-(2,4-dimethylvaleronitrile), combinations thereof.

13. The method of claim 1, wherein a mass ratio of the active component to the fluorinated poly(aryl ether) ionomer can be in a range from about 1:100 to about 40:100.

14. The method of claim 1, wherein the step of adding the crosslinking catalyst to the second solution is processed at a temperature of about 0° C. to about 30° C. of the second solution.

15. The method of claim 1, wherein a mass ratio of the crosslinking catalyst to the active component is in a range from about 0.1:100 to about 10:100.

\* \* \* \* \*